(12) United States Patent
Jun et al.

(10) Patent No.: US 9,467,033 B2
(45) Date of Patent: Oct. 11, 2016

(54) VIBRATION MOTOR AND MOBILE TERMINAL HAVING THE SAME

(71) Applicant: LG ELECTRONICS INC., Seoul (KR)

(72) Inventors: Minsu Jun, Seoul (KR); Hongki Kim, Suwon (KR); Jaecheon Choi, Uijeongbu (KR)

(73) Assignee: LG ELECTRONICS INC., Seoul (KR)

( * ) Notice: Subject to any disclaimer, the term of this patent is extended or adjusted under 35 U.S.C. 154(b) by 768 days.

(21) Appl. No.: 13/756,217

(22) Filed: Jan. 31, 2013

(65) Prior Publication Data

US 2013/0200732 A1 Aug. 8, 2013

(30) Foreign Application Priority Data

Feb. 7, 2012 (KR) .......................... 10-2012-0012516
Mar. 7, 2012 (KR) .......................... 10-2012-0023541

(51) Int. Cl.
*H02K 33/00* (2006.01)
*H02K 33/16* (2006.01)
*B06B 1/04* (2006.01)
*H02K 35/00* (2006.01)
*H02K 5/04* (2006.01)
*H02K 5/24* (2006.01)
*H02K 7/08* (2006.01)
*H04M 1/02* (2006.01)

(52) U.S. Cl.
CPC .............. *H02K 33/00* (2013.01); *B06B 1/045* (2013.01); *H02K 33/16* (2013.01); *H02K 5/04* (2013.01); *H02K 5/24* (2013.01); *H02K 7/08* (2013.01); *H02K 35/00* (2013.01); *H04M 1/026* (2013.01)

(58) Field of Classification Search
CPC ...... H02K 33/00; H02K 33/16; H02K 35/00; H02K 5/04; H02K 5/24
USPC .......... 310/12.16, 15, 16, 23, 25, 28, 51, 81, 310/91; 335/185, 19, 193
See application file for complete search history.

(56) References Cited

U.S. PATENT DOCUMENTS 4,446,394 A * 5/1984 Albert ................... G01P 15/097
                                                310/25
4,675,907 A * 6/1987 Itagaki ................... H04R 9/066
                                                381/152
8,288,922 B2 * 10/2012 Cross ................... H01L 41/0986
                                                310/311

(Continued)

FOREIGN PATENT DOCUMENTS

CN    201114215 Y    6/2000
CN    1580852 A      2/2005

(Continued)

*Primary Examiner* — Terrance Kenerly
*Assistant Examiner* — Rashad Johnson
(74) *Attorney, Agent, or Firm* — Birch, Stewart, Kolasch & Birch, LLP

(57) ABSTRACT

A vibration motor includes a housing, a coil, a moving portion, an elastic member and a roller member. The housing has a top surface, a bottom surface, and first to fourth side surfaces joining the top surface to the bottom surface, the first to fourth surfaces defining an inner circumferential surface of the housing. The coil is provided in the housing. The moving portion provided in the housing and the moving portion is configured to reciprocate between the first and third sides arranged opposite to each other. The elastic member is provided between the moving portion and the housing. The roller member is provided in the housing and arranged to come into rolling contact with the top or bottom surface of the housing.

10 Claims, 11 Drawing Sheets

(56) References Cited

U.S. PATENT DOCUMENTS

| | | | |
|---|---|---|---|
| 8,829,741 B2* | 9/2014 | Park | B06B 1/045 310/25 |
| 2005/0029876 A1 | 2/2005 | Sasaki et al. | |
| 2008/0278035 A1* | 11/2008 | Higashionji | H02N 2/026 310/330 |
| 2009/0267423 A1 | 10/2009 | Kajiwara et al. | |
| 2011/0068640 A1 | 3/2011 | Choi et al. | |
| 2011/0089772 A1* | 4/2011 | Dong | H02K 33/16 310/25 |
| 2011/0133577 A1* | 6/2011 | Lee | H02K 33/18 310/15 |
| 2011/0193428 A1* | 8/2011 | Lemieux | H02K 35/02 310/25 |
| 2011/0204732 A1* | 8/2011 | Miyamoto | H02K 33/16 310/25 |
| 2011/0266915 A1* | 11/2011 | Matsubara | H02N 1/08 310/300 |
| 2012/0049660 A1* | 3/2012 | Park | B06B 1/045 310/25 |
| 2012/0169148 A1* | 7/2012 | Kim | H02K 33/18 310/25 |
| 2012/0169151 A1* | 7/2012 | Dong | H02K 33/16 310/25 |
| 2013/0313919 A1* | 11/2013 | Nakamura | H02K 33/00 310/25 |

FOREIGN PATENT DOCUMENTS

| | | |
|---|---|---|
| CN | 201230310 Y | 4/2009 |
| CN | 102035343 A | 4/2011 |
| EP | 1 376 833 A1 | 1/2004 |
| KR | 10-2000-0031517 A | 6/2000 |

* cited by examiner

VIBRATION MOTOR AND MOBILE TERMINAL HAVING THE SAME

CROSS-REFERENCE TO RELATED APPLICATIONS

Pursuant to 35 U.S.C. §119(a), this application claims the benefit of earlier filing date and right of priority to Korean Application No. 10-2012-0012516, filed on Feb. 7, 2012 and Korean Application No. 10-2012-0023541, filed on Mar. 7, 2012 the contents of which are incorporated by reference herein in their entireties.

BACKGROUND OF THE INVENTION

1. Field of the Invention

The present disclosure relates to a vibration motor formed to vibrate a terminal and a mobile terminal having the vibration motor.

2. Description of the Conventional Art

As functions of a terminal are varied, the terminal is implemented as a type of a multimedia player having complex functions, for example, a function of photographing photos or moving pictures, a function of reproducing music and moving picture files, a function of playing games, a function of receiving broadcasting, etc.

Terminals may be divided into a mobile/portable terminal and a stationary terminal depending on their mobility. The mobile terminal is a portable device that can be carried anywhere and have one or more of a function of performing voice and video calls, a function of inputting/outputting information, a function of storing data, etc.

Efforts for improving the structural and/or software part of the mobile terminal have been made in order to support and develop these functions of the mobile terminal.

A vibration motor is a component that converts electrical energy into mechanical vibration using a principle of generating electromagnetic forces. The vibration motor has gradually become small in size and light in weight. The vibration motor is mounted in a portable terminal so as to provide a mute incoming-call notice function or various vibration functions.

Particularly, as the portable terminal has a small size and high quality, a liquid crystal display (LCD) such as a touch screen type LCD is employed in the portable terminal. As there are required functions such as a function of generating vibrations when a touch screen is touched, the improvement of the vibration motor has become more important.

A linear vibration motor can be considered as an example of the improvement. The linear vibration motor does not use a principle of rotating a motor, but generates vibrations by electromagnetic force having a resonance frequency determined by using a spring installed therein and a mass body coupled with the spring.

Therefore, it is required to consider a plan for allowing a vibration motor to become slimmer or allowing the vibration motor to be more efficiently operated by improving components used.

BRIEF SUMMARY OF THE INVENTION

Therefore, an aspect of the detailed description is to provide a vibration motor which has a further improved structure and allows a mobile terminal to become slimmer.

To achieve these and other advantages and in accordance with the purpose of this specification, as embodied and broadly described herein, a vibration motor includes a housing formed so that the inner circumferential surface except top and bottom surfaces of the housing has first to fourth sides; a coil formed in the housing; a moving portion formed to reciprocate between the first and third sides opposite to each other; an elastic member formed between the moving portion and the housing; and a roller member formed to come in rolling contact with the top or bottom surface of the housing.

In one exemplary embodiment, the roller member may be coupled to the housing.

In one exemplary embodiment, the roller member may be coupled to the moving portion.

In one exemplary embodiment, the elastic member may be formed between the moving portion and the first side or between the moving portion and the third side.

In one exemplary embodiment, the elastic member may be formed in plural numbers, and the elastic coefficient of the elastic members formed at any one side may be different from that of the elastic members formed at the other side.

In one exemplary embodiment, the moving portion or the housing may have insertion grooves into which the respective elastic members are inserted.

In one exemplary embodiment, the moving portion may have a magnet and a yoke formed to determine the direction of an electromagnetic force of the magnet.

In one exemplary embodiment, the housing may have first and second covers coupled to each other, and the first or second cover may have a mounting groove recessed from one surface thereof so that the coil is mounted in the mounting groove.

In one exemplary embodiment, the reciprocating direction of the moving portion may be an extending direction of the first and third sides.

To achieve these and other advantages and in accordance with the purpose of this specification, as embodied and broadly described herein, a mobile terminal includes a terminal main body; and a vibration motor coupled to the terminal main body so as to vibrate the terminal main body, wherein the vibration motor includes a housing having first and second covers coupled to each other so as to define an internal space; a coil formed in the housing; a moving portion formed to reciprocate between first and third sides opposite to each other in the internal space according to a change in electromagnetic field induced by the coil; and a roller member formed to come in rolling contact with the first or second cover of the housing.

To achieve these and other advantages and in accordance with the purpose of this specification, as embodied and broadly described herein, a mobile terminal includes a terminal main body; and a vibration motor coupled to the terminal main body so as to vibrate the terminal main body, wherein the vibration motor includes a housing having first and second covers coupled to each other so as to define an internal space; a moving portion formed to reciprocate between first and third sides opposite to each other in the internal space; an elastic member formed between the moving portion and the housing; and guide portions respectively formed at second and fourth sides adjacent to the first and third sides so as to guide the moving portion.

The mobile terminal according to the exemplary embodiments configured as described above uses a motor vibrated in the lateral direction, so that it is possible to miniaturize the mobile terminal and to perform a design for optimizing the deployment of components in the mobile terminal.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

The accompanying drawings, which are included to provide a further understanding of the invention and are incorporated in and constitute a part of this specification, illustrate exemplary embodiments and together with the description serve to explain the principles of the invention. In the drawings.

DETAILED DESCRIPTION OF THE INVENTION

Hereinafter, a vibration motor and a mobile terminal having the same according to the present disclosure will be explained in more detail with reference to the attached drawings. For the sake of brief description with reference to the drawings, the same or equivalent components will be provided with the same reference numbers, and description thereof will not be repeated. Singular expressions include plural expressions which do not have any obviously different meaning in view of a context.

The mobile terminal according to the present disclosure may include a portable phone, a smart phone, a laptop computer, a digital broadcasting terminal, Personal Digital Assistants (PDA), Portable Multimedia Player (PMP), a navigation system, etc. However, it will be obvious to those skilled in the art that the present invention may be also applicable to a fixed terminal such as a digital TV and a desktop computer.

Figure 1:
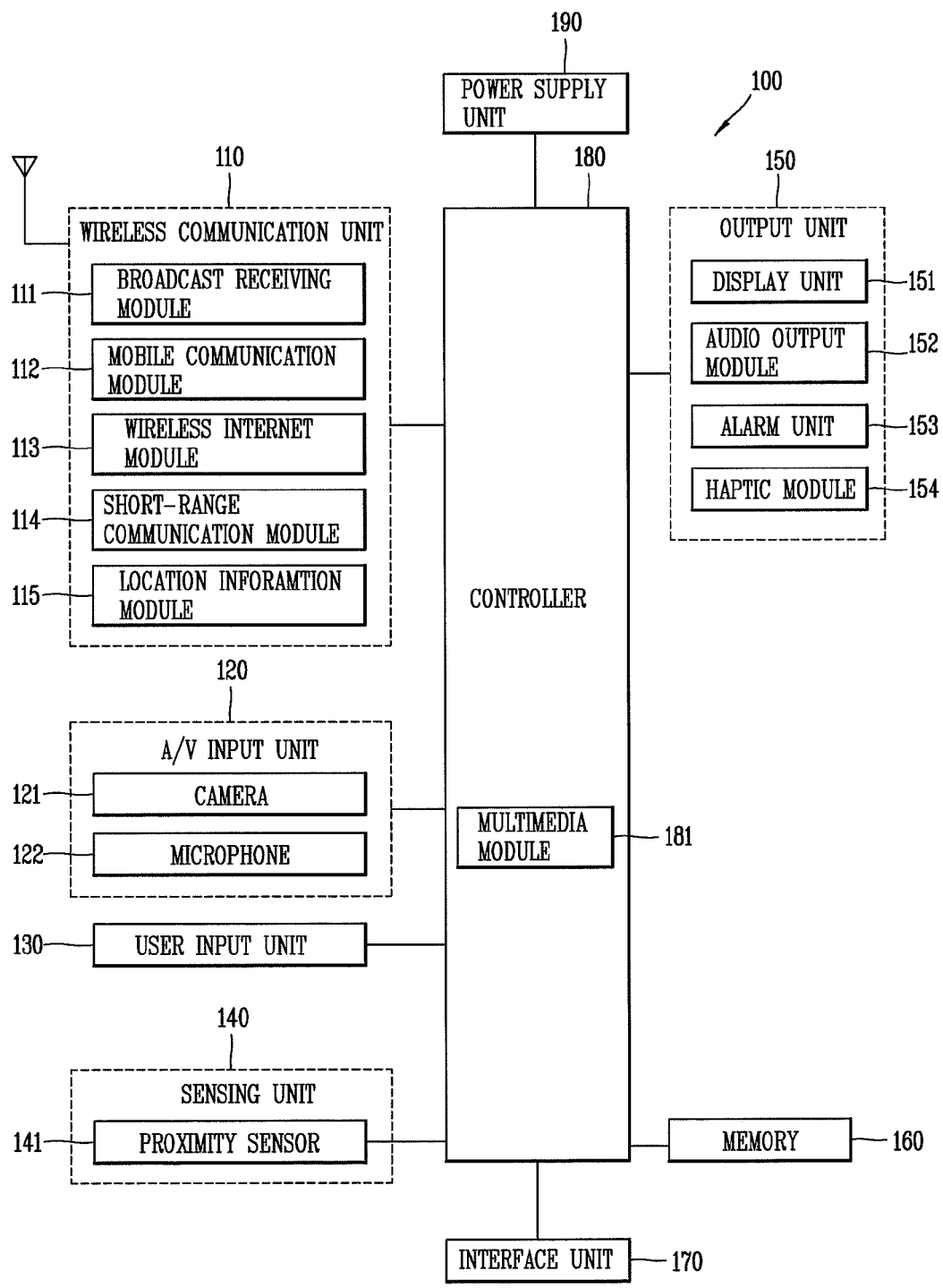
FIG. 1 is a block configuration diagram of a mobile terminal according to an exemplary embodiment.

The mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components. Hereinafter, each of the above components will be explained.

The wireless communication unit 110 typically includes one or more components allowing radio communication between the mobile terminal 100 and a wireless communication system or a network in which the mobile terminal is located. For example, the wireless communication unit 110 may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal. The broadcast associated information may refer to information associated with a broadcast channel, a broadcast program or a broadcast service provider. The broadcast associated information may be provided via a mobile communication network. In this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcasting signals and/or broadcasting associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for sensing or calculating a position of a mobile terminal. An example of the position information module 115 may include a Global Position System (GPS) module.

Referring to FIG. 1, the A/V input unit 120 is configured to receive an audio or video signal. The A/V input unit 120 may include a camera 121, a microphone 122 or the like. The camera 121 processes image data of still pictures or video acquired by an image capture device in a video capturing mode or an image capturing mode. The processed image frames may be displayed on a display 151.

The image frames processed by the camera 121 may be stored in the memory 160 or transmitted via the wireless communication unit 110. The camera 121 may be provided in two or more according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100, the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is open or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner. The output unit 150 may include the display 151, an audio output module 152, an alarm unit 153, a haptic module 154, and the like.

The display 151 may display information processed in the mobile terminal 100. For example, when the mobile terminal 100 is in a phone call mode, the display 151 may display a User Interface (UI) or a Graphic User Interface (GUI) associated with a call or other communication (such as text messaging, multimedia file downloading, etc.). When the mobile terminal 100 is in a video call mode or image capturing mode, the display 151 may display a captured image and/or received image, a UI or GUI.

The display 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of these displays may be configured to be transparent so that outside may be seen therethrough, which may be referred to as a transparent display. A representative example of the transparent display may include a Transparent Organic Light Emitting Diode (TOLED), and the like. The rear surface portion of the display 151 may also be implemented to be optically transparent. Under this configuration, a user can view an object positioned at a rear side of a body through a region occupied by the display 151 of the body.

The display 151 may be implemented in two or more in number according to a configured aspect of the mobile terminal 100. For instance, a plurality of displays may be arranged on one surface integrally or separately, or may be arranged on different surfaces.

Here, if the display 151 and a touch sensitive sensor (referred to as a touch sensor) have a layered structure therebetween, the structure may be referred to as a touch screen. The display 151 may be used as an input device rather than an output device. The touch sensor may be implemented as a touch film, a touch sheet, a touch pad, and the like.

The touch sensor may be configured to convert changes of a pressure applied to a specific part of the display 151, or a capacitance occurring from a specific part of the display 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display 151 has been touched.

Referring to FIG. 1, a proximity sensor 141 may be arranged at an inner region of the mobile terminal blocked by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, and so on.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. The video signal or the audio signal may be output via the display 151 or the audio output module 152. Accordingly, the display 151 or the audio output module 152 may be classified as part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner. The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like. The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen. The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof. For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller 180. For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2:
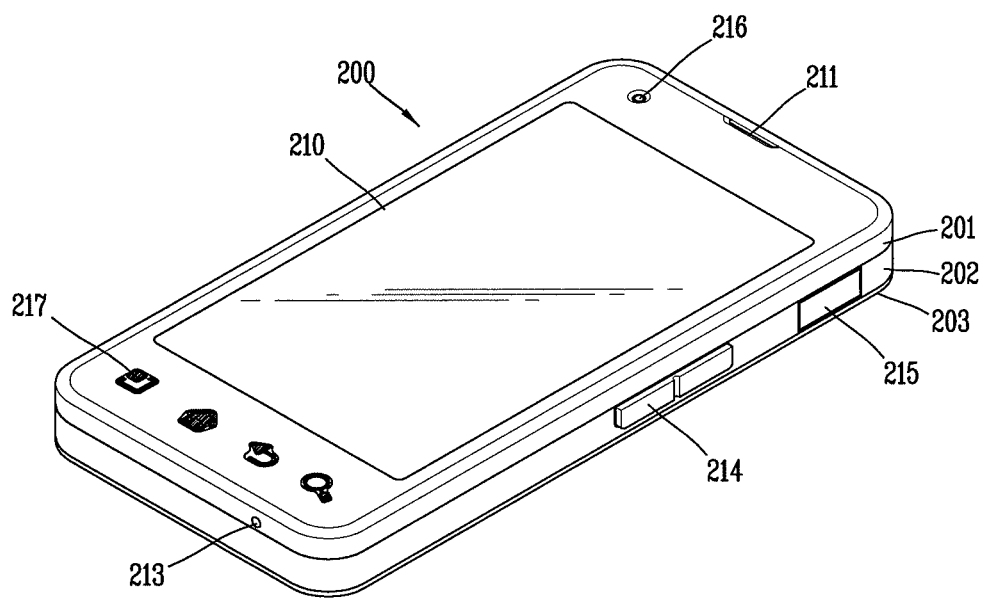
FIG. 2 is a front perspective view of a mobile terminal according to an exemplary embodiment.
Figure 3:
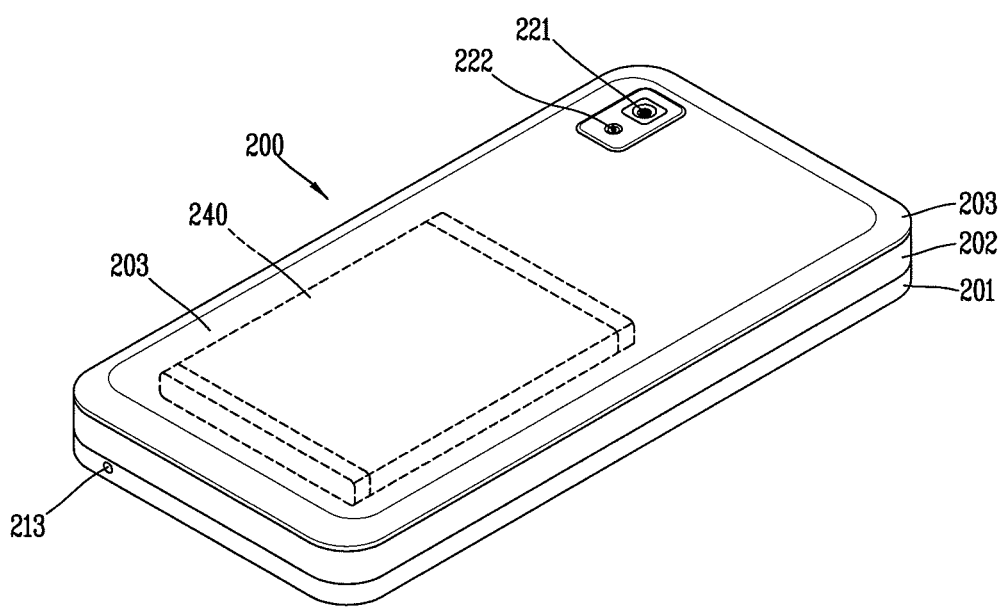
FIG. 3 is a rear perspective view of the mobile terminal of FIG. 2.

FIG. 2 is a front perspective view of a mobile terminal according to the present invention, and FIG. 3 is a rear perspective view of the mobile terminal of FIG. 2. Referring to FIGS. 2 and 3, the mobile terminal 200 according to the present invention is a bar type mobile terminal. However, the present invention is not limited to this, but may be applied to a slide type in which two or more bodies are coupled to each other so as to perform a relative motion, a folder type, or a swing type, a swivel type and the like. Further, the mobile terminal of the present invention may be also applicable to any portable electronic device having a camera and a flash, e.g., a portable phone, a smart phone, a notebook computer, a digital broadcasting terminal, Personal Digital Assistants (PDAs), Portable Multimedia Players (PMPs), etc.

A case (casing, housing, cover, etc.) which forms the appearance of a body may include a front case 201, a rear case 202 covering an opposite surface to the front case 201, and a cover 203 which constitutes the rear surface of the mobile terminal 200 by being coupled to the rear case 202. A space formed by the front case 201 and the rear case 202 may accommodate various components therein. Such cases may be formed by injection-molded synthetic resin, or may be formed using a metallic material such as stainless steel (STS) or titanium (Ti).

On the front surface of the body, may be disposed a display 210, a first audio output unit 211, a front camera 216, a side key 214, an interface unit 215 and a user input unit 217.

The display 210 includes a liquid crystal display (LCD) module, organic light emitting diodes (OLED), e-paper, etc., each for visually displaying information. The display 210 may include a touch sensing means for inputting information in a touch manner. Hereinafter, the display 210 including the touch sensing means is called 'touch screen'. Once part on the touch screen 210 is touched, content corresponding to the touched position is input. The content input in a touch manner, may be characters, or numbers, or menu items which can be set in each mode. The touch sensing means may be transmissive so that the display can be viewed, and may include a structure for enhancing visibility of the touch screen at a bright place. Referring to FIG. 2, the touch screen 210 occupies most of the front surface of the front case 201.

The first audio output unit 211 may be implemented as a receiver for transmitting a call sound to a user's ear, or a loud speaker for outputting each type of alarm sound or a playback sound of multimedia.

The front camera 216 processes image frames such as still images or moving images, obtained by an image sensor in a video call mode or a capturing mode. The processed image frames may be displayed on the display 210. The image frames processed by the front camera 216 may be stored in the memory 160, or may be transmitted to the outside through the wireless communication unit 110. The front camera 216 may be implemented in two or more according to a user's interface.

The user input unit 217 is manipulated to receive a command for controlling the operation of the mobile terminal 200, and may include a plurality of input keys. The input keys may be referred to as manipulation portions, and may include any type of ones that can be manipulated in a user's tactile manner.

For instance, the user input unit 217 may be implemented as a dome switch, or a touch screen, or a touch pad for inputting commands or information in a user's push or touch manner. Alternatively, the user input unit 217 may be implemented, for example, as a wheel for rotating a key, a jog, or a joystick. The user input unit 217 is configured to input various commands such as START, END and SCROLL.

A side key 214, an interface unit 215, an audio input unit 213, etc. are disposed on the side surface of the front case 201. The side key 214 may be called 'manipulation unit', and may be configured to receive commands for controlling the operation of the mobile terminal 200. The side key 214 may include any type of ones that can be manipulated in a user's tactile manner. Content input by the side key 214 may be variously set. For instance, through the side key 214, may be input commands such as controlling the front and rear cameras 216 and 221, controlling the level of sound output from the audio output unit 211, and converting a current mode of the display 210 into a touch recognition mode.

The audio output unit 213 may be implemented as a microphone for receiving a user's voice, other sound, etc.

The interface unit 215 serves a path through which the mobile terminal 200 performs data exchange, etc. with an external device. For example, the interface unit 215 may be at least one of a connection terminal through which the mobile terminal 200 is connected to an ear phone by cable or radio, a port for local area communication, e.g., an infrared data association (IrDA) port, a Bluetooth portion, a wireless LAN port, and power supply terminals for supplying power to the mobile terminal 200. The interface unit 215 may be a card socket for accommodating an external card such as a subscriber identification module (SIM) card, a user identity module (UIM) card or a memory card for storing information.

A power supply unit 240 and the rear camera 221 are disposed on the rear surface of the body. A flash 222 and a mirror (not shown) may be disposed close to the rear camera 221. When capturing an object by using the rear camera 221, the flash 222 provides light onto the object. When the user captures an image of himself/herself by using the rear camera 221, the mirror can be used for the user to look at himself/herself therein.

The rear camera 221 may face a direction which is opposite to a direction faced by the front camera 216, and may have different pixels from those of the front camera 216. For example, the front camera 216 may operate with relatively lower pixels (lower resolution). Thus, the front camera 216 may be useful when a user can capture his face and send it to another party during a video call or the like. On the other hand, the rear camera 221 may operate with a relatively higher pixels (higher resolution) such that it can be useful for a user to obtain higher quality pictures for later use. The front camera 216 and the rear camera 221 may be installed at the body so as to rotate or pop-up.

The power supply unit 240 is configured to supply power to the mobile terminal 200. The power supply unit 260 may be mounted in the body, or may be detachably mounted to the body.

Figure 4:
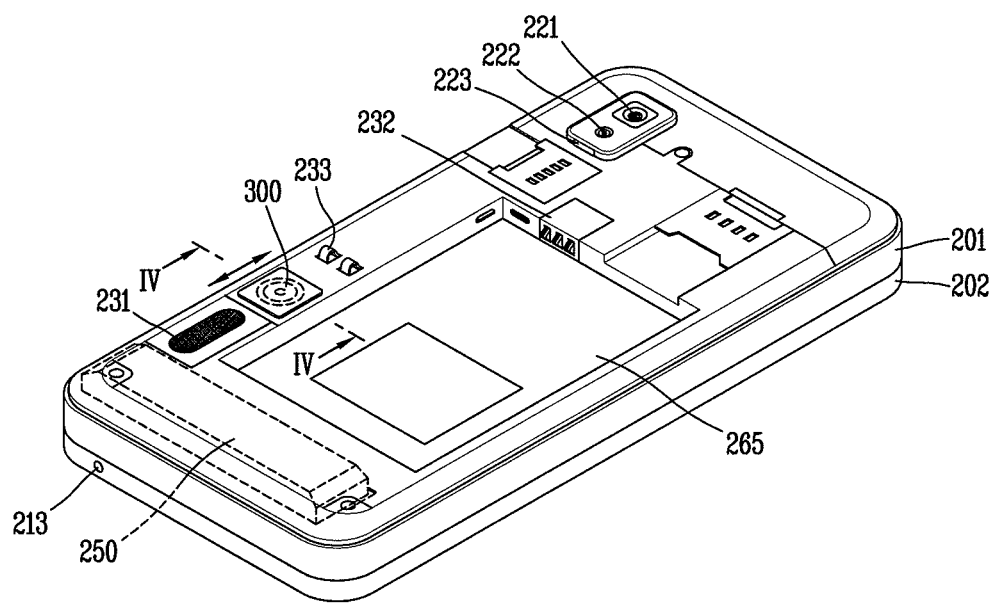
FIG. 4 is a perspective view illustrating a state in which a battery case is removed in FIG. 3.
Figure 5:
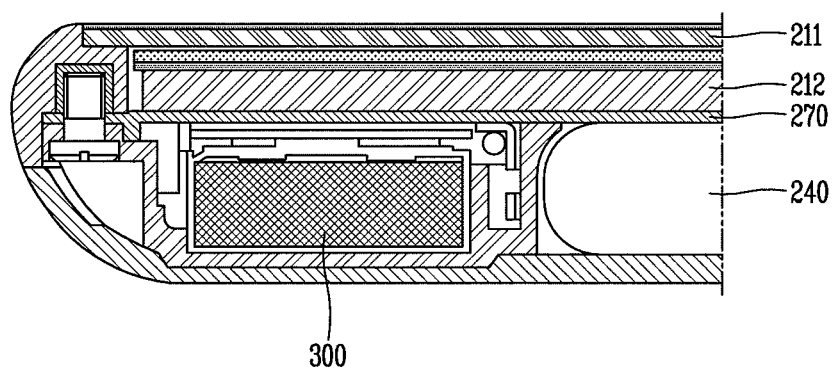
FIG. 5 is a partial sectional view taken along line IV-IV of FIG. 4.

FIG. 4 is a perspective view illustrating a state in which a battery case is removed in FIG. 3. FIG. 5 is a partial sectional view taken along line IV-IV of FIG. 4. As shown in FIGS. 4 and 5, a vibration motor 300 may be mounted in the mobile terminal so as to vibrate the mobile terminal. Conventionally, a rotary type motor was used as the vibration motor 300. However, the rotation of the rotary type motor is continued for a certain period of time after the power of the rotary type motor is cut off, and therefore, vibrations are maintained. Further, the rotary type motor requires a certain space in which the rotary type motor can be rotated, and therefore, it is difficult to miniaturize the mobile terminal. In addition, since kinetic energy is distributed in radial directions of rotation about the rotation axis, it is difficult to concentrate the kinetic energy in any one direction. Therefore, various factors such as prevention of secondary vibration are necessarily considered in order to fix and support the vibration motor 300. Accordingly, in an exemplary embodiment, there is provided a linear vibration motor 300 formed so that a moving portion 320 can reciprocate in any one direction. Thus, linear vibration motor 300 can overcome disadvantages of the conventional rotary type motor described above.

As shown in FIGS. 4 and 5, the vibration motor 300 according to the exemplary embodiment may be disposed near components sensitive to vibration, such as a speaker 231 or contact point 233. The speaker 231 is formed so that a diaphragm in the speaker 231 is vibrated in the thickness direction thereof, and the contact point 233 is electrically connected in the thickness direction to another contact point of the battery case. In this case, if vibrations are applied in the thickness direction to the speaker 231 and the contact point 233, the speaker 231 and the contact point 233 may not show their original performances. Thus, if the vibration motor that does not vibrate in the longitudinal direction but vibrates in the lateral direction is used in the exemplary embodiment, the deployment of components in the mobile terminal can be more freely performed. That is, the motor vibrating in the lateral direction is used, so that it is possible to miniaturize the mobile terminal and to perform an optimal design on the deployment of components in the mobile terminal.

Although the vibration motor 300 according to the exemplary embodiment is used, the vibration motor 300 is preferably spaced apart from the image input unit 221 at a predetermined interval. At least one buffer member 223 is provided between the image input unit 221 and the vibration motor 300, so that it is possible to prevent vibrations applied to the image input unit 221 during photographing.

Figure 6:
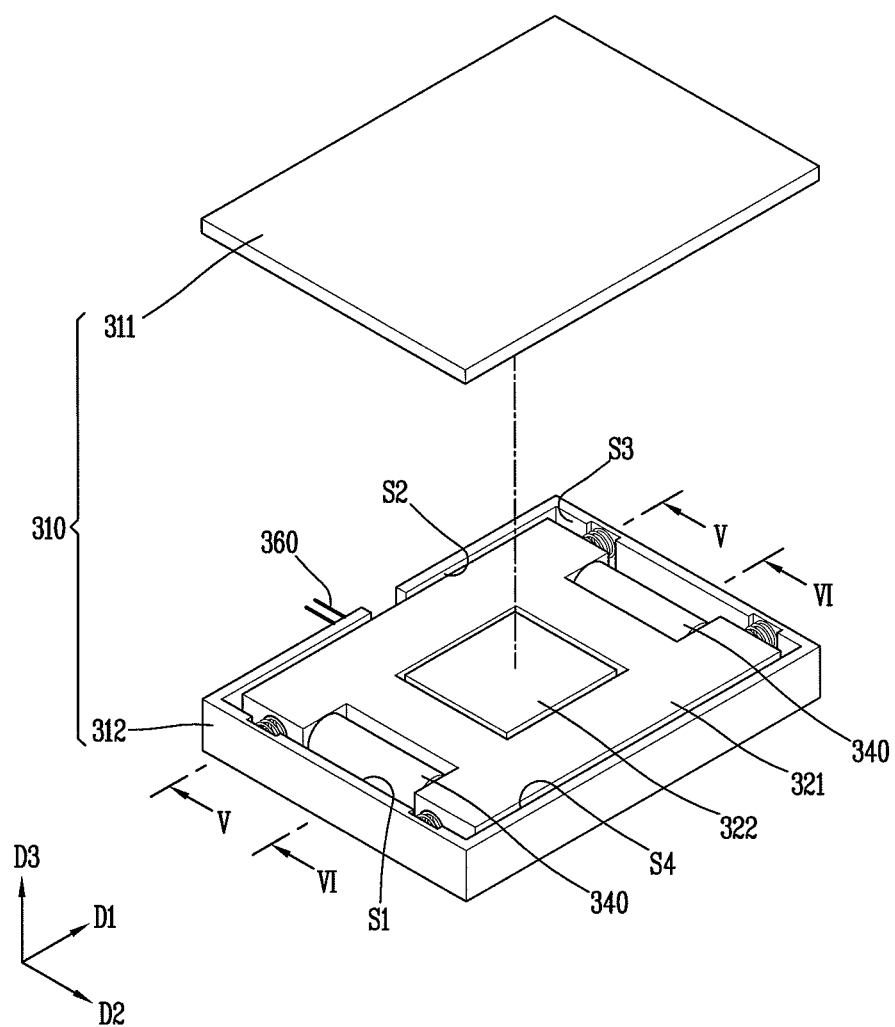
FIG. 6 is a perspective view of a vibration motor shown in FIG. 3 according to a first exemplary embodiment.
Figure 7:
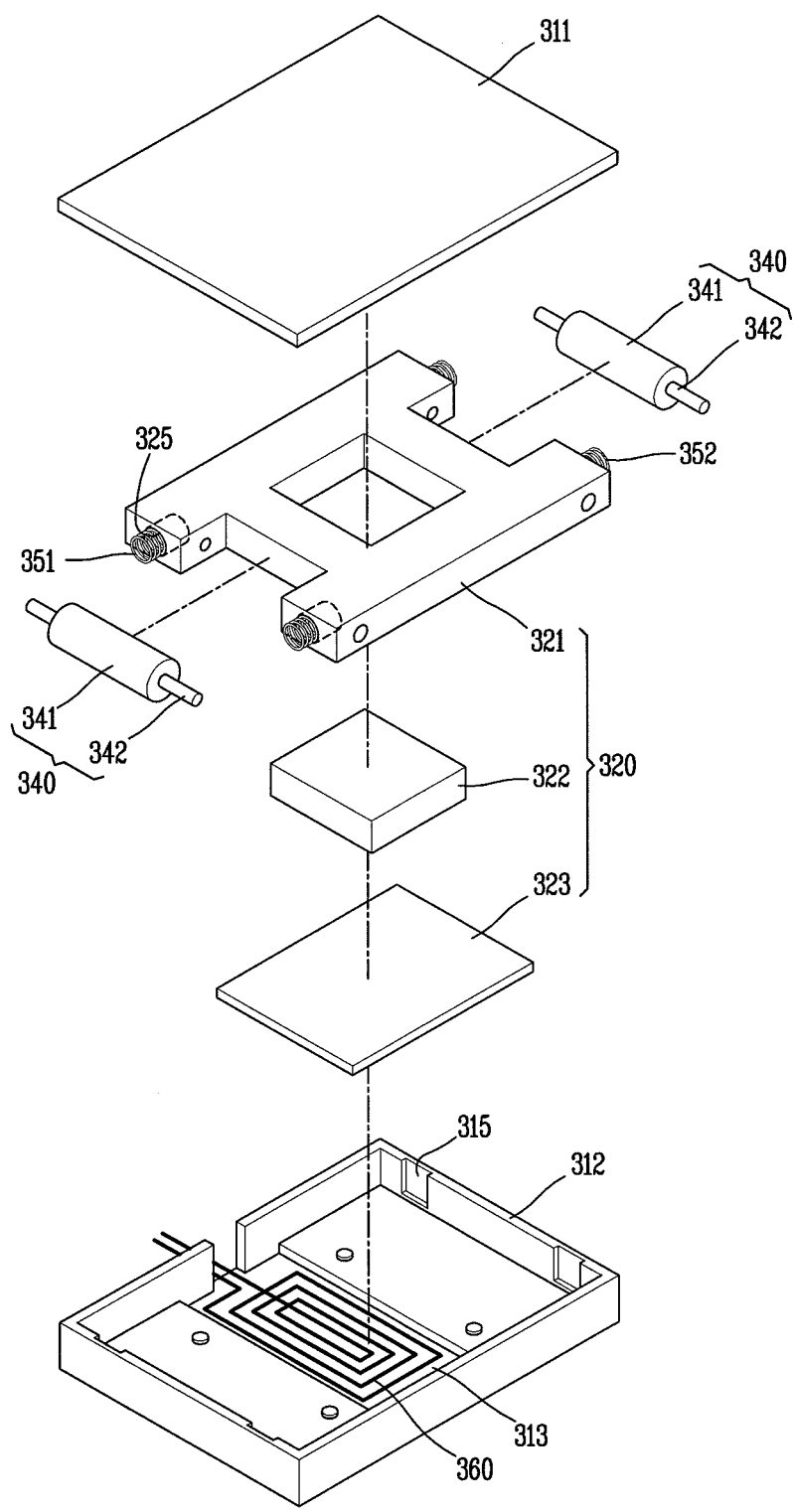
FIG. 7 is an exploded perspective view of FIG. 6.
Figure 8:
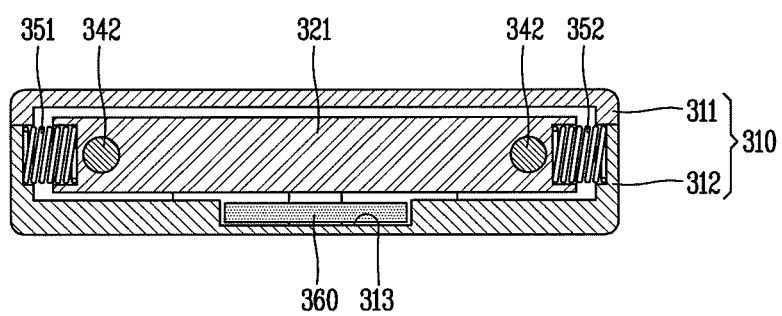
FIG. 8 is a sectional view taken along line V-V of FIG. 6.
Figure 9:
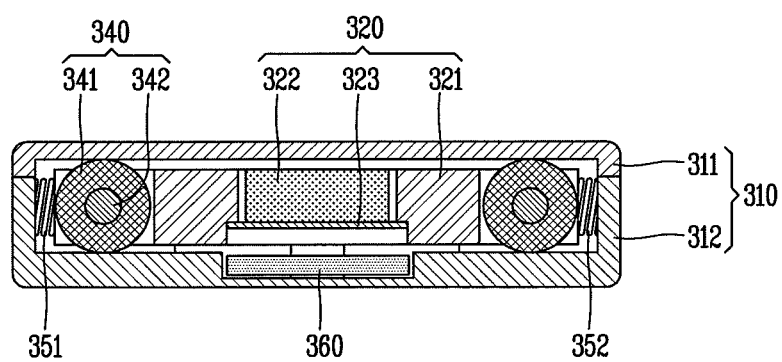
FIG. 9 is a sectional view taken along line VI-VI of FIG. 6.

FIG. 6 is a perspective view of a vibration motor shown in FIG. 3 according to a first exemplary embodiment. FIG. 7 is an exploded perspective view of FIG. 6. FIG. 8 is a sectional view taken along line V-V of FIG. 6. FIG. 9 is a sectional view taken along line VI-VI of FIG. 6. Referring to FIGS. 6 to 9, the vibration motor 300 includes a housing 310, a coil 360, a moving portion 320 and elastic members 351 and 352.

An internal space is formed in the housing 310 so that internal components can be accommodated in the internal space. The housing 310 may be formed in the shape of a rectangular parallelepiped having top and bottom surfaces and four side surfaces in the inner circumference thereof. Alternatively, the housing 310 may be formed in the shape of a regular hexahedron. The housing 310 may be formed to include a first cover 311 and a second cover 312.

It will be defined that the direction in which the length of the rectangular parallelepiped is long is a length direction D1 and the direction in which the length of the rectangular parallelepiped is short is a width direction D2. In addition, it will be defined that the side surfaces opposite to each other in the length direction are first and third sides S1 and S3, and the side surfaces opposite to each other are second and fourth sides S2 and S4.

Each corner portion of the housing 310 formed in the shape of the rectangular parallelepiped may be formed to be a curved surface. Thus, a curved surface is formed at each end portion of the housing 310, so that the housing 310 can better support a load applied in the vertical direction.

The coil 360 is formed in the housing 310, and may be formed on any one of the first and second covers 311 and 312. The coil 360 is disposed on the inner surface of the cover. The cover may have a mounting groove 313 recessed from one surface thereof. In this case, the coil 360 is disposed in the mounting groove 313. Thus, the thickness of the entire second cover 312 of the housing 310 can be decreased by the depth of the mounting groove 313. The coil 360 may be disposed in plural numbers so as to further increase an electromagnetic force applied to the moving portion 320, when necessary.

The moving portion 320 may be formed to reciprocate between the first and third sides S1 and S3 opposite to each other among the four sides of the housing 310. The moving portion 320 is formed to have a predetermined mass, and the mass at both ends in the length direction of the housing 310 may be formed greater than that of a central portion of the housing 310 so that displacement is increased in the direction where the moving portion 320 reciprocate.

The moving portion 320 includes a body 321, a magnet 322 and a yoke 323, and may be integrally formed with the magnet 322 and the yoke 323. Alternatively, the yoke 323 may be fixed to any one portion of the housing 310, and the moving portion 320 may include only the magnet 322. The moving portion 320 has a groove recessed toward the inside thereof, and the magnet 322 may be mounted in the groove. The yoke 323 may be disposed to cover the groove. Each of the magnet 322 and the yoke 323 may be formed in the shape of a rectangular plate. Alternatively, the moving portion 320 may have a hole passing through the top and bottom surfaces thereof, and the magnet 322 and the yoke 323 may be disposed to cover the hole.

The magnet 322 is formed at a central portion of the moving portion 320 so as to generate a magnetic flux. The magnet 322 may be formed in a single or plural numbers. In a case where the magnet 322 is formed in plural numbers, the magnets 322 may be disposed opposite to the yoke 323 while being spaced apart from one another at a predetermined interval.

The magnet 322 and the coil 360 are disposed to generate an electromagnetic force for allowing the moving portion 320 to reciprocate in the extending direction of the first and third sides S1 and S3.

The yoke 323 is disposed opposite to the magnet 322 so as to focus the magnetic flux of the magnet 322. In order to facilitate focusing the magnetic flux of the magnet 322, the yoke 323 may be formed to have a section broader than that of the magnet 322.

If external power is applied to the coil 360, the direction of current flowing in the coil 360 is changed. In this case, the direction of the current is changed, thereby reciprocating the moving portion 320. Here, AC power may be used as the external power, but DC power may be used as the external power. In a case where the DC power is used as the external power, the moving portion 320 may be reciprocated using the supply and cutoff of the DC power and the elasticity and restoration of a spring. In this case, the coil 360 may be disposed to be biased to any one side in the housing 310. That is, the coil 360 may be disposed to be biased to any one side on the inner surface of the first or second cover 311 or 312.

The elastic members 351 and 352 are disposed at both ends of the moving portion 320, respectively. More specifically, the elastic members 351 and 352 may be disposed between the first side S1 of the housing 310 and the moving portion 320 and between the third side S3 and the moving portion 320, respectively.

The elastic members 351 and 352 may be configured as coil springs, torsion springs, leaf springs, etc. In the exemplary embodiment, the coil springs are used as the elastic members 351 and 352. As shown in these figures, the elastic members 351 and 352 are disposed at both the ends of the moving portion 320, respectively. Alternatively, the elastic members 351 and 352 may be formed in plural numbers between the first side S1 and the moving portion 320 and between the third side S3 and the moving portion 320, respectively. The deployment of the elastic members 351 and 352 can increase their elasticity and restoration with respect to the moving portion 320 and prevent the one-sided movement of the moving portion 320.

The elastic coefficients of the elastic members 351 and 352 may be formed different from each other. For example, the elastic coefficient of the elastic members 351 formed at the first side S1 is formed greater than that of the elastic members 352 formed at the third side S3, so that the displacement of the moving portion 320 can be further increased in the vibration of the vibration motor 300.

The housing 310 may have insertion grooves 315 into which the respective elastic members are inserted. The moving portion 320 may have insertion grooves 325 into which the respective elastic members are inserted. As such, the elastic members are not fixed to the housing or the moving portion by welding or screws, and hence it is possible to decrease the possibility that the elastic members may be disconnected or deformed. Thus, the durability of components can be improved.

As shown in FIG. 8, the moving portion 320 performing the reciprocating motion and the housing 310 are spaced apart from each other at a certain gap in the thickness direction thereof. The secondary vibration may be generated in the thickness direction D3 (See FIG. 6) of the vibration motor 300 due to the gap. In order to prevent the secondary vibration, the moving portion 320 and the housing 310 are adhered closely to each other, so that the vibration can be reduced due to the frictional force between the moving portion 320 and the housing 310. Hereinafter, a structure for preventing the secondary vibration will be described with reference to the accompanying drawings.

As shown in FIGS. 6 and 7, roller members 340 are formed at both ends of the moving portion 320, facing the first and third sides S1 and S3 of the housing 310, respectively. The roller member 340 has a cylindrical body 341 and shaft coupling portions 342 respectively protruded from both ends of the body 341. The cylindrical body 341 is formed to come in rolling contact with each of the first and second covers 311 and 312. The diameter of the cylindrical body 341 is formed greater than the thickness of the moving portion 320. Thus, when the moving portion 320 reciprocates in the housing 310, the roller member 340 comes in rolling contact with each of the top and bottom surfaces of the housing 310, and the movement of the moving portion 320 in the housing 310 is guided by the rolling member 340.

The shaft coupling portion 342 is coupled to the moving portion 320 so as to be relatively rotated with respect to the housing 310. The moving portion 320 has a groove into which each shaft coupling portion 342 can be inserted.

The vibration motor 300 includes the roller members 340 as described above, so that it is possible to prevent the vibration of the moving portion 320 in the thickness direction in the internal space of the housing 310.

Although not shown in these figures, each of the first and second covers 311 and 312 may have a groove portion recessed from one surface thereof. The groove portion may be surface-treated in order to decrease the frictional force between the housing 310 and the roller member 340. As an example of the surface treatment, an oil layer may be formed on one surface of the groove portion.

Figure 10:
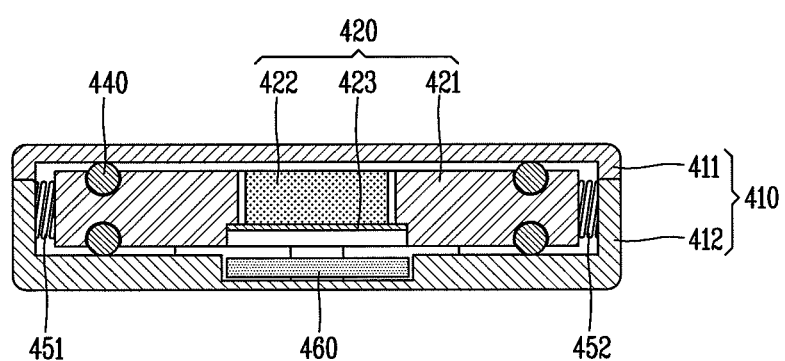
FIG. 10 is a sectional view of a vibration motor according to a second exemplary view.
Figure 11:
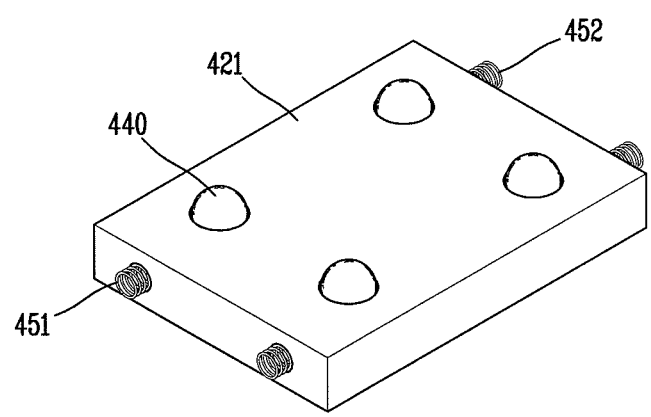
FIG. 11 is a perspective view of a moving body shown in FIG. 10.

FIG. 10 is a sectional view of a vibration motor according to a second exemplary view. FIG. 11 is a perspective view of a moving body shown in FIG. 10. As described above, a moving portion 420 and a housing 410 are spaced apart from each other at a certain gap. Therefore, the secondary vibration may be generated in the thickness direction of the vibration motor 400 due to the gap. In order to prevent the secondary vibration in the thickness direction, the moving portion 420 may include roller members 440. The roller members 440 may be formed on top and bottom surfaces of the moving portion 420, facing inner surfaces of first and second covers 411 and 412, respectively.

The roller members 440 are formed in a ball shape to be inserted into the moving portion 420. The moving portion 420 has grooves into which the respective roller members 440 are inserted, and each groove has an opened surface formed to have a diameter smaller than that of the roller member 440. A spring may be disposed between the roller member 440 and the moving portion 420 so as to elastically support the roller member 440.

Only one side of the roller member 440 may come in rolling contact with the housing 410, and the other side of the roller member 440 may be spaced apart from the inner surface of the groove of the moving portion 420 at a predetermined interval. Alternatively, one side of the roller member 440 may come in rolling contact with the housing 410, and the other side of the roller member 440 may come in rolling contact with the groove of the moving portion 420.

The roller member 440 is preferably formed to have a small diameter so that the frictional force between the roller member 440 and the housing 410 is decreased by minimizing the portion of the roller member 440 contacting the housing 410.

The vibration motor 400 includes the roller members 440 as described above, so that it is possible to prevent the vibration of the moving portion 420 in the thickness direction in an internal space of the housing 410.

In the second exemplary embodiment, the other components (e.g., body 421, magnet 422, yoke 423, springs 451 and 452 and coil 460) except the roller members 440 and the moving portion 420 coupled to the roller members 440 are identical or similar to those of the first exemplary embodiment, and therefore, their detailed descriptions will be omitted and the reference numbers.

Figure 12:
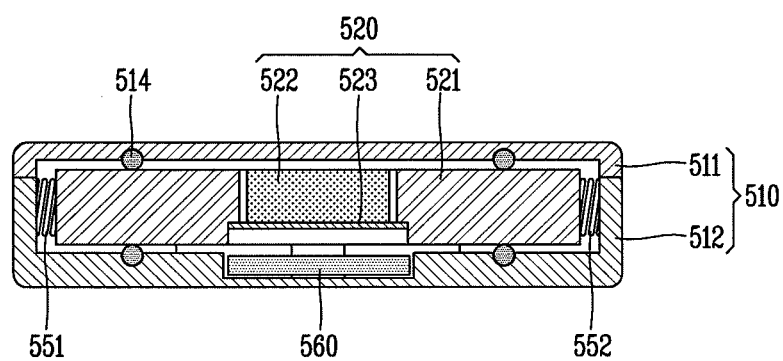
FIG. 12 is a sectional view of a vibration motor according to a third exemplary view.
Figure 13:
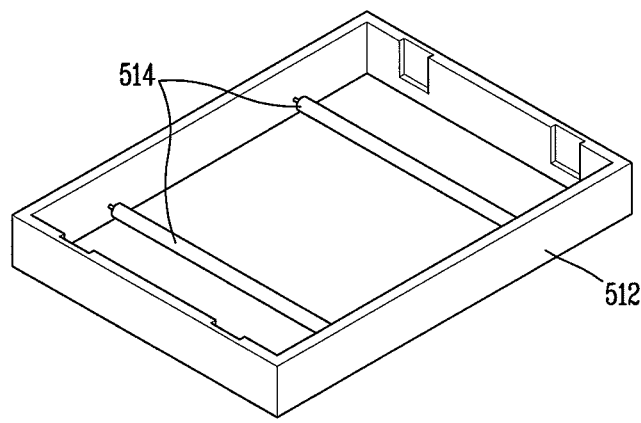
FIG. 13 is a perspective view of a second cover shown in FIG. 12.

FIG. 12 is a sectional view of a vibration motor according to a third exemplary view. FIG. 13 is a perspective view of a second cover shown in FIG. 12. As described above, a moving portion 520 and a housing 510 are spaced apart from each other at a certain gap. Therefore, the secondary vibration may be generated in the thickness direction of the vibration motor 500 due to the gap. In order to prevent the secondary vibration in the thickness direction, the housing 510 may include roller members 514. The roller members 514 may be formed on inner surfaces of first and second covers 511 and 512, respectively.

The roller member 514 may be formed in plural numbers to be spaced apart from each other on each of the first and second covers 511 and 512. The roller members 514 may be respectively disposed close to both side ends of the first and second covers 511 and 512 so as to support the moving portion 520 even at the maximum displacement in the reciprocating motion of the moving portion 520.

The roller member 514 has a cylindrical body and shaft coupling portions respectively protruded from both ends of the body. The shaft coupling portions of the roller member 514 are relatively rotatably coupled to the housing 510. The shaft coupling portions are coupled to second and fourth sides of the housing 510, respectively. The second and fourth sides of the housing 510 have grooves into which the shaft coupling portions can be inserted, respectively.

One side of the roller member 514 may come in rolling contact with the moving portion 520, and the other side of the roller member 514 may come in rolling contact with the housing 510. Alternatively, only the one side of the roller member 514 may come in rolling contact with the moving portion 520, and the other side of the roller member 514 may be spaced apart from the housing 510 at a predetermined interval.

The roller member 514 is preferably formed to have a diameter as small as possible so that the frictional force between the roller member 514 and the moving portion 520 is decreased by minimizing the portion of the roller member 514 contacting the moving portion 520.

The vibration motor 500 includes the roller members 514 as described above, so that it is possible to prevent the vibration of the moving portion 520 in the thickness direction in an internal space of the housing 510.

In the second exemplary embodiment, the other components (e.g., body 521, magnet 522, yoke 523, springs 551 and 552 and coil 560) except the roller members 514 and the housing 510 coupled to the roller members 514 are identical or similar to those of the first exemplary embodiment, and therefore, their detailed descriptions will be omitted.

As described in the first to third exemplary embodiments, the roller members are formed on the moving portion or the housing, so that it is possible to guide the movement of the moving portion and to reduce or prevent vibrations in other directions except the moving direction.

Further, since the vibration in the thickness direction of the vibration motor can be minimized, it is possible to reduce the gap in the thickness direction, required in design so as to prevent abrasion due to the contact between the moving portion and the housing. That is, it is possible to reduce the gap in the thickness direction between the moving portion and the housing, thereby providing a slimmer vibration motor and a mobile terminal having the same.

Figure 14:
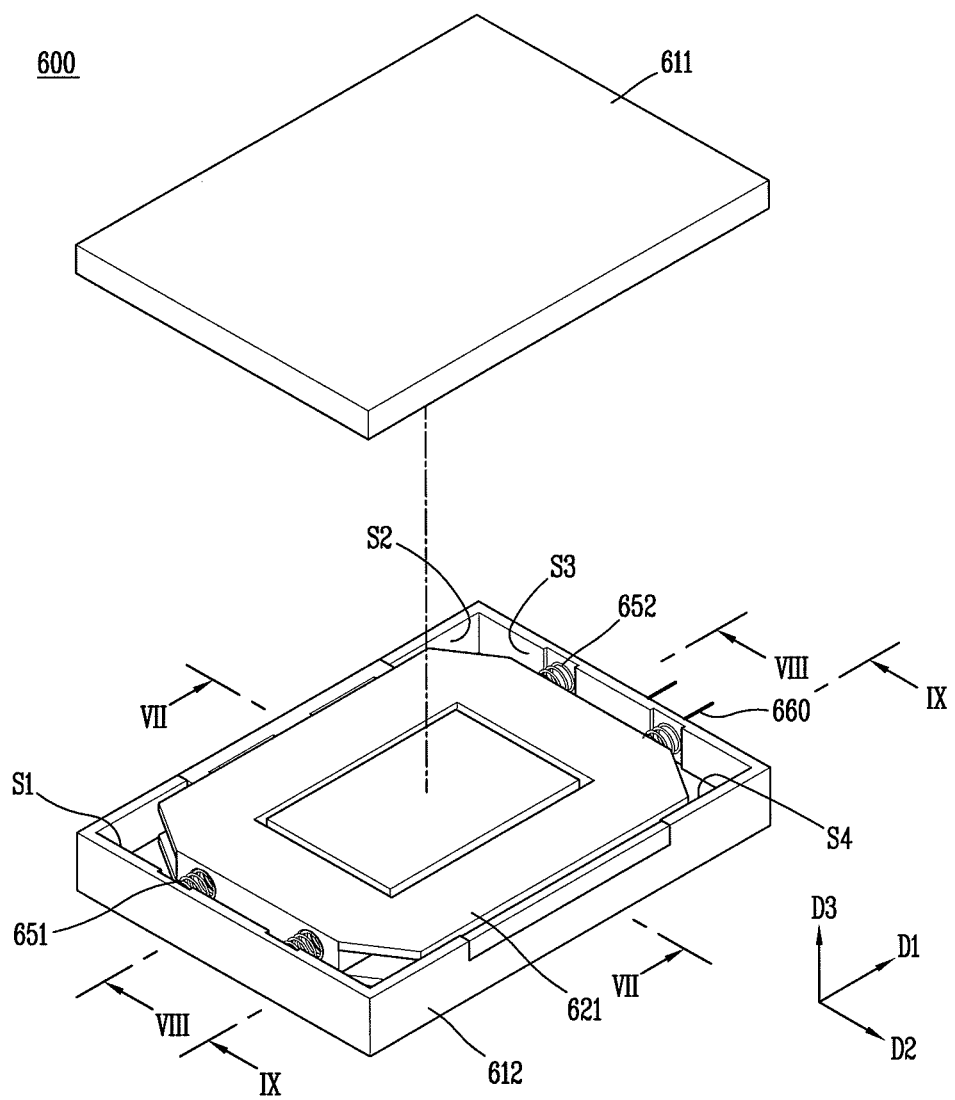
FIG. 14 is a sectional view of a vibration motor according to a fourth exemplary view.
Figure 15:
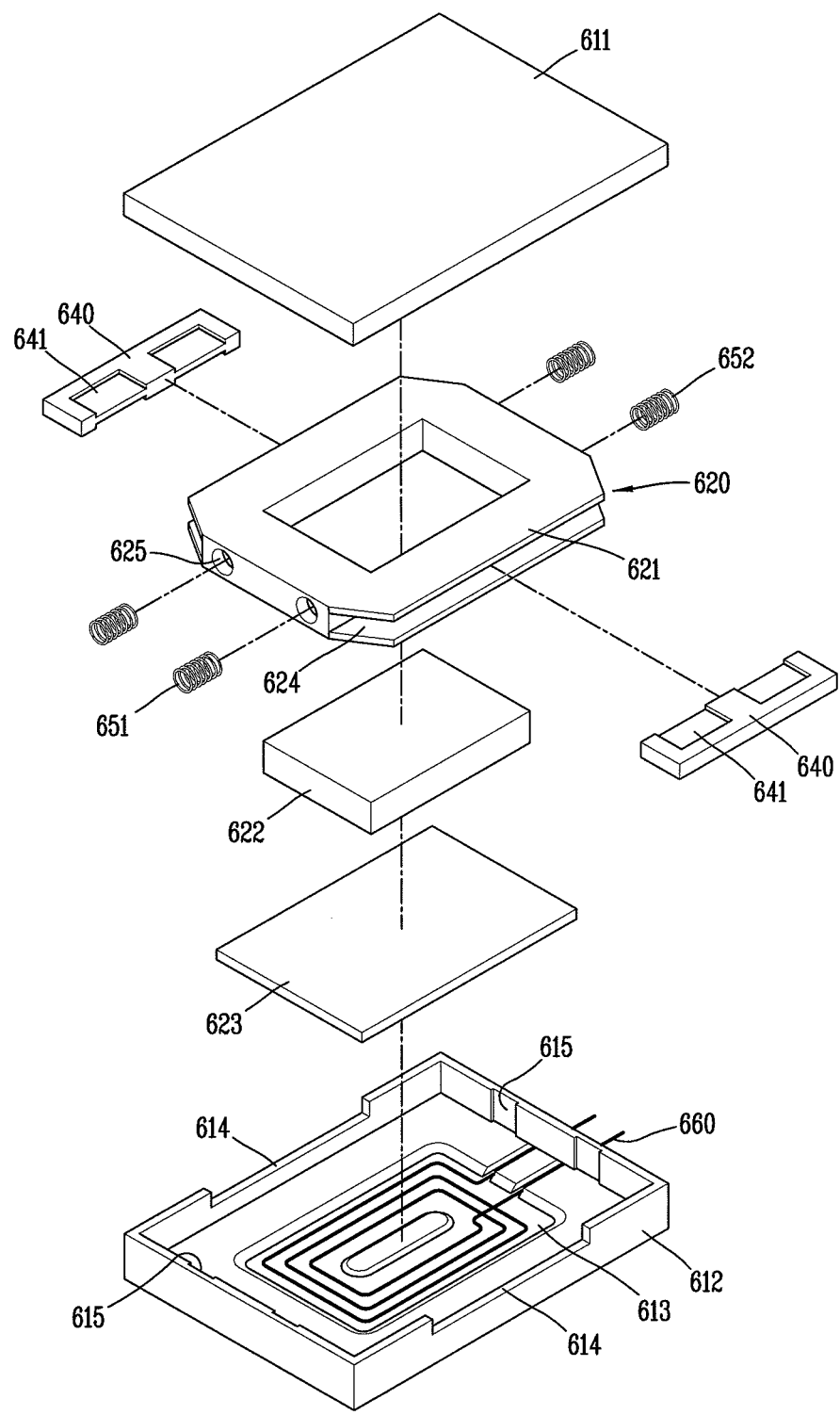
FIG. 15 is an exploded perspective view of FIG. 14.
Figure 16:
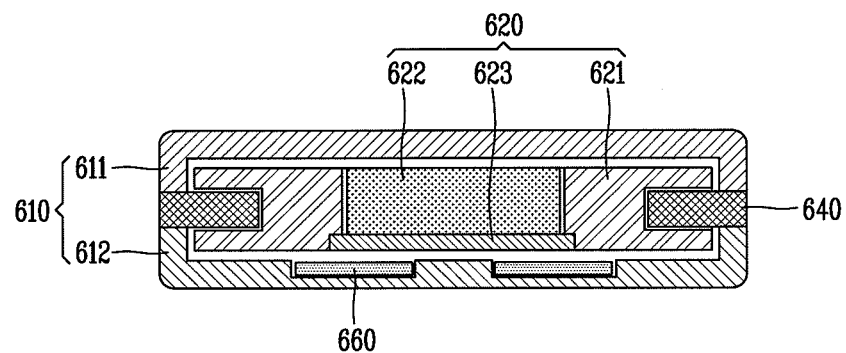
FIG. 16 is a sectional view taken along line VII-VII of FIG. 14.
Figure 17:
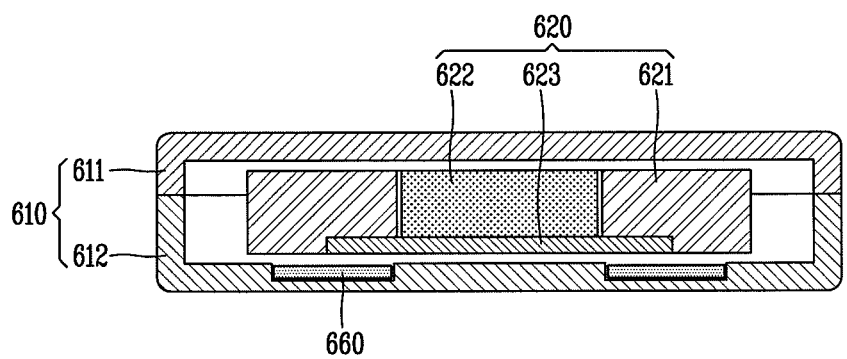
FIG. 17 is a sectional view taken along line VIII-VIII of FIG. 14.
Figure 18:
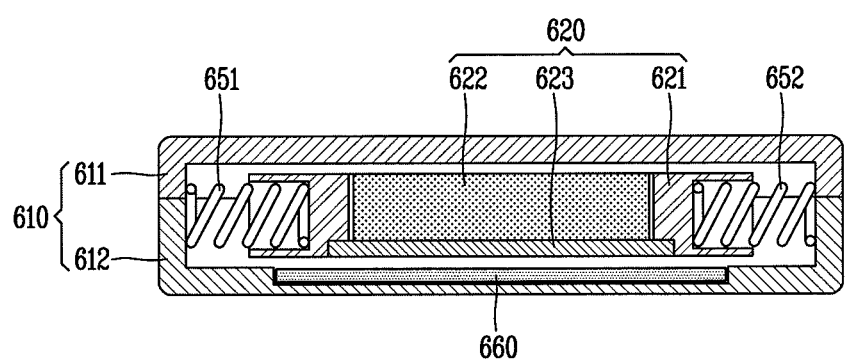
FIG. 18 is a sectional view taken along line IX-IX of FIG. 14.

FIG. 14 is a sectional view of a vibration motor according to a fourth exemplary view. FIG. 15 is an exploded perspective view of FIG. 14. FIG. 16 is a sectional view taken along line VII-VII of FIG. 14. FIG. 17 is a sectional view taken along line VIII-VIII of FIG. 14. FIG. 18 is a sectional view taken along line IX-IX of FIG. 14. Referring to FIGS. 14 to 18, the vibration motor 600 includes a housing 610, a coil 660, a moving portion 620 and elastic members 651 and 652. An internal space is formed in the housing 610 so that internal components can be accommodated in the internal space. The housing 610 may be formed in the shape of a rectangular parallelepiped having top and bottom surfaces and four side surfaces in the inner circumference thereof. Alternatively, the housing 610 may be formed in the shape of a regular hexahedron. The housing 610 may be formed to include a first cover 611 and a second cover 612.

It will be defined that the direction in which the length of the rectangular parallelepiped is long is a length direction D1 and the direction in which the length of the rectangular parallelepiped is short is a width direction D2. In addition, it will be defined that the side surfaces opposite to each other in the length direction are first and third sides S1 and S3, and the side surfaces opposite to each other are second and fourth sides S2 and S4.

Each corner portion of the housing 610 formed in the shape of the rectangular parallelepiped may be formed to be a curved surface. Thus, a curved surface is formed at each end portion of the housing 610, so that the housing 610 can better support a load applied in the vertical direction.

The coil 660 is formed in the housing 610, and may be formed on any one of the first and second covers 611 and 612. The coil 660 is disposed on the inner surface of the cover. The cover may have a mounting groove 613 recessed from one surface thereof. In this case, the coil 660 is disposed in the mounting groove 613. Thus, the thickness of the entire second cover 612 of the housing 610 can be decreased by the depth of the mounting groove 613. The coil 660 may be disposed in plural numbers so as to further increase an electromagnetic force applied to the moving portion 620, when necessary.

The moving portion 620 may be formed to reciprocate between the first and third sides S1 and S3 opposite to each other among the four sides of the housing 610. The moving portion 620 is formed to have a predetermined mass, and the mass at both ends in the length direction of the housing 610 may be formed greater than that of a central portion of the housing 610 so that displacement is increased in the direction where the moving portion 620 reciprocate. The moving portion 620 includes a body 621, a magnet 622 and a yoke 623, and may be integrally formed with the magnet 622 and the yoke 623. Alternatively, the yoke 623 may be fixed to any one portion of the housing 610, and the moving portion 620 may include only the magnet 622.

The moving portion 620 has a groove recessed toward the inside thereof, and the magnet 622 may be mounted in the groove. The yoke 623 may be disposed to cover the groove. Each of the magnet 622 and the yoke 623 may be formed in the shape of a rectangular plate. Alternatively, the moving portion 620 may have a hole passing through the top and bottom surfaces thereof, and the magnet 622 and the yoke 623 may be disposed to cover the hole.

The magnet 622 is formed at a central portion of the moving portion 620 so as to generate a magnetic flux. The magnet 622 may be formed in a single or plural numbers. In a case where the magnet 622 is formed in plural numbers, the magnets 622 may be disposed opposite to the yoke 623 while being spaced apart from one another at a predetermined interval.

The magnet 622 and the coil 660 are disposed to generate an electromagnetic force for allowing the moving portion 320 to reciprocate in the extending direction of the first and third sides S1 and S3.

The yoke 623 is disposed opposite to the magnet 622 so as to focus the magnetic flux of the magnet 622. In order to facilitate focusing the magnetic flux of the magnet 622, the yoke 623 may be formed to have a section broader than that of the magnet 622.

If external power is applied to the coil 660, the direction of current flowing in the coil 660 is changed. In this case, the direction of the current is changed, thereby reciprocating the moving portion 620. Here, AC power may be used as the external power, but DC power may be used as the external power. In a case where the DC power is used as the external power, the moving portion 620 may be reciprocated using the supply and cutoff of the DC power and the elasticity and restoration of a spring. In this case, the coil 660 may be disposed to be biased to any one side in the housing 610. That is, the coil 660 may be disposed to be biased to any one side on the inner surface of the first or second cover 611 or 612.

The elastic members 651 and 652 are disposed at both ends of the moving portion 620, respectively. More specifically, the elastic members 651 and 652 may be disposed between the first side S1 of the housing 310 and the moving portion 620 and between the third side S3 and the moving portion 620, respectively. The elastic members 651 and 652 may be configured as coil springs, torsion springs, leaf springs, etc. In the exemplary embodiment, the coil springs are used as the elastic members 651 and 652.

As shown in these figures, the elastic members 651 and 652 are disposed at both the ends of the moving portion 620, respectively. Alternatively, the elastic members 651 and 652 may be formed in plural numbers between the first side S1 and the moving portion 620 and between the third side S3 and the moving portion 620, respectively. The deployment of the elastic members 651 and 652 can increase their elasticity and restoration with respect to the moving portion 620 and prevent the one-sided movement of the moving portion 620.

The elastic coefficients of the elastic members 651 and 652 may be formed different from each other. For example, the elastic coefficient of the elastic members 651 formed at the first side S1 is formed greater than that of the elastic members 652 formed at the third side S3, so that the displacement of the moving portion 620 can be further increased in the vibration of the vibration motor 600.

The housing 610 may have insertion grooves 615 into which the respective elastic members are inserted. The moving portion 620 may have insertion grooves 625 into which the respective elastic members are inserted. As such, the elastic members are not fixed to the housing or the moving portion by welding or screws, and hence it is possible to decrease the possibility that the elastic members may be disconnected or deformed. Thus, the durability of components can be improved.

As shown in FIG. 16, the moving portion 620 performing the reciprocating motion and the housing 610 are spaced apart from each other at a certain gap in the thickness direction thereof. The secondary vibration may be generated in the thickness direction D3 (See FIG. 6) of the vibration motor 600 due to the gap. In order to prevent the secondary vibration, the moving portion 620 and the housing 610 are adhered closely to each other, so that the vibration can be reduced due to the frictional force between the moving portion 620 and the housing 610. Hereinafter, a structure for preventing the secondary vibration will be described with reference to the accompanying drawings.

As shown in FIGS. 17 and 18, guide portions 640 are formed at the second and fourth sides S2 and S4 of the housing 610, respectively. The guide portions 640 are coupled to the housing 610 so as to guide the moving portion 620. The moving portion 620 has grooves 624 into which the respective guide portions 640 are inserted. Thus, in the vibration of the vibration motor 600, the moving portion 620 is formed to relatively slide and move with respect to the housing 610. That is, the moving portion 620 having the grooves 624 can reciprocate while sliding along the guide portions 640. The guide portions 640 may be coupled to the second and fourth sides S2 and S4 of the housing 610, respectively. To this end, the housing 610 may have coupling portions 614.

In order to reduce the frictional force between the guide portion 640 and the moving portion 620, the contact area between the guide portion 640 and the moving portion 620 is preferably decreased. To this end, the guide portion 640 may have a guide groove 641 recessed from one surface thereof.

Although not shown in these figures, the guide portion 640 may be coupled to a means such as a bearing for reducing the frictional force.

Although it has been illustrated in the exemplary embodiment that the grooves are formed in the moving portion 620, and the guide portions 640 are coupled to the housing 610, the grooves may be formed in the second and fourth sides S2 and S4 of the housing 610, respectively, and protruding members may be formed on the sides opposite to the second and fourth sides S2 and S4 so as to be protruded from the sides, respectively.

As described above, the grooves or guide portions are formed in the moving portion or the housing, so that it is possible to limit the moving direction of the moving portion and to reduce or prevent vibrations in other directions except the moving direction.

Further, since the vibration in the thickness direction of the vibration motor can be minimized, it is possible to reduce the gap in the thickness direction, required in design so as to prevent abrasion due to the contact between the moving portion and the housing. That is, it is possible to reduce the gap in the thickness direction between the moving portion and the housing, thereby providing a slimmer vibration motor and a mobile terminal having the same.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vibration motor comprising:
   a housing having a top surface, a bottom surface, and first to fourth side surfaces joining the top surface to the bottom surface, the first to fourth surfaces defining an inner circumferential surface of the housing;

a coil provided in the housing;

a moving portion provided in the housing, the moving portion being configured to reciprocate between the first and third side surfaces arranged opposite to each other;

an elastic member provided between the moving portion and the housing; and a roller member provided in the housing and arranged to come into rolling contact with the top or bottom surface of the housing, the roller member having a cylindrical body and shaft coupling portions respectively protruded from both ends of the cylindrical body, wherein a diameter of the cylindrical body is greater than a thickness of the moving portion, wherein the roller member is coupled to the moving portion, wherein the elastic member comprises:

a first elastic member located between the moving portion and the first side surface; and a second elastic member located between the moving portion and the third side surface, and wherein an elastic coefficient of the first elastic member is different from an elastic coefficient of the second elastic member.

2. The vibration motor of claim 1, wherein the moving portion or the housing has insertion grooves into which the elastic members are inserted.

3. The vibration motor of claim 1, wherein the moving portion has a magnet and a yoke formed to determine the direction of an electromagnetic force of the magnet.

4. The vibration motor of claim 1, wherein the housing has first and second covers coupled to each other, the first or second cover has a mounting groove recessed from one surface thereof, and the coil is mounted in the mounting groove.

5. The vibration motor of claim 1, wherein a reciprocating direction of the moving portion is arranged such that the moving portion moves closer to and further away from the first side surface while reciprocating.

6. A mobile terminal comprising:

a terminal main body; and a vibration motor coupled to the terminal main body to vibrate the terminal main body, the vibration motor including:

a housing having a top surface, a bottom surface, and first to fourth side surfaces joining the top surface to the bottom surface, the first to fourth side surfaces defining an inner circumferential surface of the housing;

a coil provided in the housing;

a moving portion provided in the housing, the moving portion configured to reciprocate between the first and third side surfaces arranged opposite to each other;

an elastic member provided between the moving portion and the housing; and a roller member provided in the housing and arranged to come into rolling contact with the top or bottom surface of the housing, the roller member having a cylindrical body and shaft coupling portions respectively protruded from both ends of the cylindrical body, wherein a diameter of the cylindrical body is formed greater than a thickness of the moving portion, wherein the roller member is coupled to the moving portion, wherein the elastic member comprises:

a first elastic member located between the moving portion and the first side surface; and a second elastic member located between the moving portion and the third side surface, and wherein an elastic coefficient of the first elastic member is different from an elastic coefficient of the second elastic member.

7. The mobile terminal of claim 6, wherein the moving portion or the housing has insertion grooves into which the elastic members are inserted.

8. The mobile terminal of claim 6, wherein the moving portion has a magnet and a yoke formed to determine the direction of an electromagnetic force of the magnet.

9. The mobile terminal of claim 6, wherein the housing has first and second covers coupled to each other, the first or second cover has a mounting groove recessed from one surface thereof, and the coil is mounted in the mounting groove.

10. The mobile terminal of claim 6, wherein a reciprocating direction of the moving portion is arranged such that the moving portion moves closer to and further away from the first side surface while reciprocating.

* * * * *